US012619976B1

(12) United States Patent
Durairaj et al.

(10) Patent No.: US 12,619,976 B1
(45) Date of Patent: May 5, 2026

(54) PRIVATE VAULT MANAGED USING A NON-FUNGIBLE TOKEN

(71) Applicant: UIPCO, LLC, San Antonio, TX (US)

(72) Inventors: Ravi Durairaj, San Antonio, TX (US); Salvador Adrian Bretado, San Antonio, TX (US); Hanna Elizabeth Rafferty, San Antonio, TX (US); Pradeep R. Mangalagiri, Naperville, IL (US); Justin Royell Nash, Little Elm, TX (US); Marshall Hercules Felder, San Antonio, TX (US); Brian Tougas, Spring Branch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 452 days.

(21) Appl. No.: 18/164,971

(22) Filed: Feb. 6, 2023

(51) Int. Cl.
H04L 9/08          (2006.01)
G06Q 20/36          (2012.01)
H04L 9/00          (2022.01)

(52) U.S. Cl.
CPC ....... G06Q 20/3674 (2013.01); H04L 9/0825 (2013.01); H04L 9/50 (2022.05); *G06Q 2220/18* (2013.01)

(58) Field of Classification Search
CPC ............ G06Q 20/3674; G06Q 2220/18; H04L 9/0825; H04L 9/50
See application file for complete search history.

(56) References Cited

U.S. PATENT DOCUMENTS

| | | | |
|---|---|---|---|
| 12,141,871 B1* | 11/2024 | James | G06Q 20/065 |
| 2013/0315565 A1* | 11/2013 | Yamaguchi | H04N 21/6334 |
| | | | 386/259 |
| 2021/0248653 A1* | 8/2021 | McKenzie | H04L 9/3247 |
| 2022/0309491 A1* | 9/2022 | Shapiro | G06F 21/64 |
| 2022/0351186 A1* | 11/2022 | Quigley | H04L 9/50 |
| 2022/0414809 A1* | 12/2022 | Geng | G06F 21/64 |
| 2023/0034169 A1* | 2/2023 | Ferenczi | H04L 9/0894 |
| 2023/0268040 A1* | 8/2023 | Cordonnier | G16H 50/70 |
| | | | 705/3 |
| 2023/0316263 A1* | 10/2023 | Eby | H04L 9/3271 |
| 2023/0359709 A1* | 11/2023 | Nickerson | G06V 20/20 |
| 2024/0037593 A1* | 2/2024 | Navon | G06Q 20/389 |
| 2024/0256691 A1* | 8/2024 | Hwang | G06Q 20/389 |

* cited by examiner

*Primary Examiner* — Andrew Suh
(74) *Attorney, Agent, or Firm* — Potomac Law Group, PLLC; Dannon G. Allbee

(57) ABSTRACT

Aspects of the present disclosure are directed to managing a metadata vault with a non-fungible token. Implementations can mint a non-fungible token (NFT) that corresponds to a tangible person or thing. A metadata vault can store metadata about the person or thing, and the NFT can secure access to the metadata vault. For example, the NFT can include a credential (e.g., public key) that comprises access permission for the private vault. In some implementations, a private key that corresponds to the public key can be provide a user, such as an authenticated user, additional access to the private vault. For example, the public key can provide a first level of access to the private vault (e.g., either read access or write access) and the private key can provide a second level of access to the private vault (e.g., both read access or write access).

20 Claims, 9 Drawing Sheets

PRIVATE VAULT MANAGED USING A NON-FUNGIBLE TOKEN

TECHNICAL FIELD

The present disclosure is directed to managing a metadata vault with a non-fungible token.

BACKGROUND

A blockchain is a list of records, each called a block, which can be linked through cryptography. Each block includes a timestamp, a hash of the previous block, and transaction data. The timestamp proves that the transaction data was included when the block was added in order to get its hash. Because each block specifies the block previous to it, the set of blocks make a chain, with each new block reinforcing the set of blocks before it in the chain. Therefore, blockchains are very difficult to modify because data, once added to the blockchain, cannot be altered without altering all subsequent blocks.

Non-Fungible Tokens (NFTs), are blockchain-backed identifiers specifying a unique (digital or real-world) item. Through a distributed ledger, the ownership of these tokens can be tracked and verified. Such tokens can link to a representation of the unique item, e.g., via a traditional URL or a distributed file system such as IPFS. While a variety of blockchain systems support NFTs, common platforms that supports NFT exchange allow for the creation of unique and indivisible NFT tokens.

Traditionally, NFTs represent a way of being able to define ownership for practically anything that is digital. In other words, any material that can be digitized or which is already in a digital format can be the subject of an NFT. Some examples of NFT content can include digital photographs, video frames, social media interactions, and virtually all items that can be converted for receipt and processing by a computer (e.g., a scanned autograph). Asset ownership via digital items, such as NFTs, has grown in popularity. NFTs can include identifying information that identifies the asset tied to the NFT, such as unique identifying information, a web link, or other suitable identifying information. NFTs can be managed on a blockchain, thus providing transparency and reliability to the asset ownership. Conventional NFT are tied to digital assets, such as images, videos, digital collectibles, and the like.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
FIG. 1 is a block diagram illustrating an overview of devices on which some implementations can operate.
Figure 1:
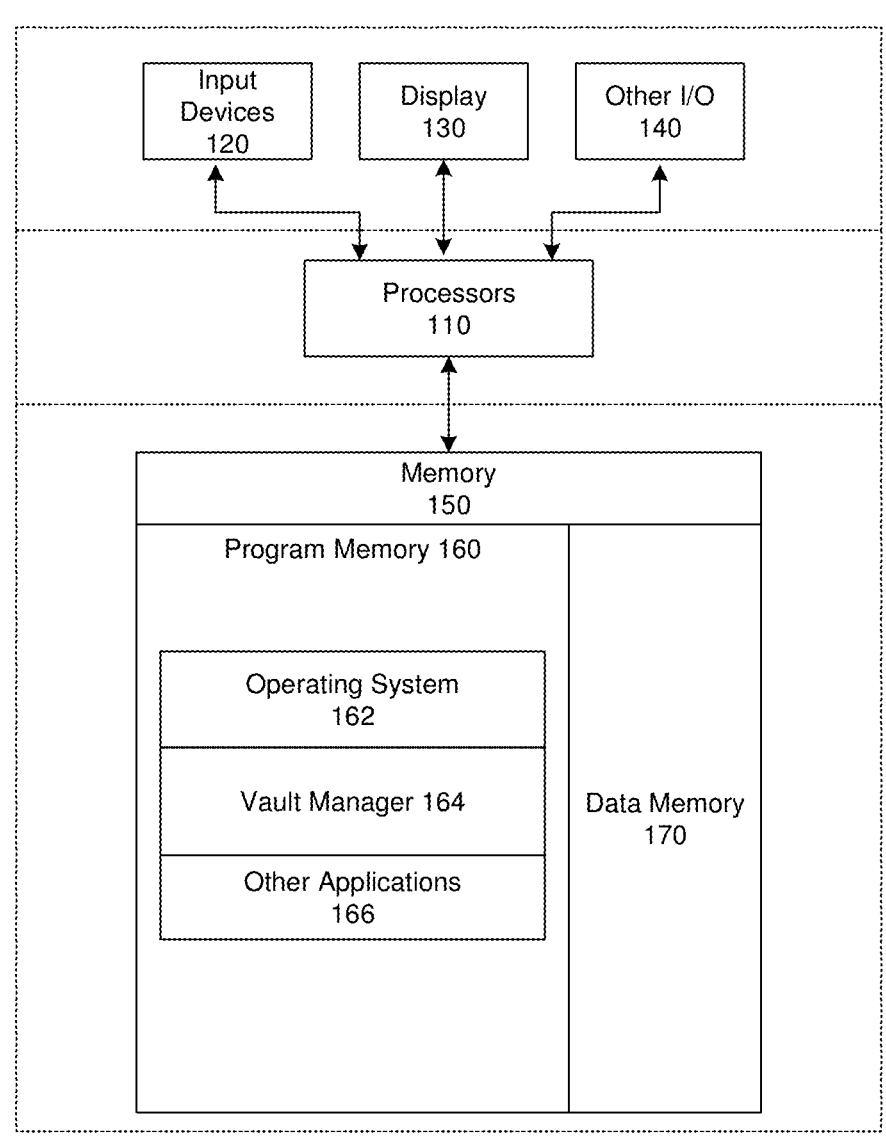

Aspects of the present disclosure are directed to managing a metadata vault with a non-fungible token. Implementations can mint a non-fungible token (NFT) that corresponds to a tangible person or thing. A metadata vault can store metadata about the person or thing, and the NFT can secure access to the metadata vault. For example, the NFT can include a credential (e.g., public key) that comprises access permission for the private vault. In some implementations, a private key that corresponds to the public key can be provided to a user, such as an authenticated user (e.g., authenticated as the person or the owner of the thing that corresponds to the NFT).

Non-Fungible Tokens (NFTs) are blockchain-backed identifiers specifying a unique item. Implementations of a blockchain service mint a NFT that correspond to a tangible person or thing. The NFT can include an identifier for the tangible person or thing, such as identifying information of a person (e.g., name, birthdate, hash of a PIN or portion of a social security number, etc.), personal property (e.g., vehicle identification number (VIN), identifier for real-estate plot, such as an address, etc.), and/or other suitable identifying information. The NFT can also include a credential that corresponds to the tangible person or thing, such as a public key that grants access to a private vault for the tangible person or thing. In some implementations, the NFT can include a link (e.g., web link) to a data file that stores the credential (e.g., public key).

In some implementations, an authentication service can authenticate a user identity and/or ownership of personal property. For example, in response to a user request to own/initiate a private vault that stores metadata comprising the health records of a person, the authentication service can authenticate the user identity as the person. In another example, in response to a user request to own/initiate a private vault that stores metadata for personal property (e.g., home, vehicle, jewelry, etc.), the authentication service can authenticate the user as the owner of the personal property (e.g., original owner or new owner).

Based on the authentication, a blockchain service can generate a token wallet for the authenticated user and mint the NFT that corresponds to the person or thing. For example, the minted NFT can comprise: identifying information about the person or thing; and a public key that corresponds to the person or thing (e.g., corresponds to the private vault for the person or thing). The blockchain service can then transfer the minted NFT to the authenticated user's token wallet and write this transaction to a blockchain to maintain a ledger for the NFT.

Implementations can provide a private key (that corresponds to the public key) to the authenticated user. The public key can provide a first level of access to the private vault (e.g., either read access or write access) and the private key can provide a second level of access to the private vault (e.g., both read access or write access). For example, third-party entities can access the private value using the public key and the user can access the private vault using the private key. In some implementations, a third-party entity can write to the private vault using the corresponding public key. In this example, a user can access the private vault with a private key (e.g., that corresponds to the public key) and read/retrieve the metadata stored by the third-party entity. In some implementations, a user can write to the private vault using the private key. In this example, the third-party entity can access the private vault using the public key (e.g., that corresponds to the private key) and read/retrieve the metadata stored by the user.

In some implementations, the NFT and ownership of the private vault can be transferred from an original user to a new user. For example, personal property (e.g., a residential home, a vehicle, etc.) can be sold to a new owner, and the NFT and corresponding private vault can be transferred to the new owner. In this example, the authentication service can authenticate the transfer of the personal property from the previous owner to the new owner. In response to the authentication, a blockchain service can implement logic (e.g., a smart contract) that performs transfer of the NFT. For example, the logic can transfer the NFT from the token wallet of the previous owner/user to the token wallet of the new owner/user. In some implementations, ownership transfer of the personal property and/or transfer of the NFT can include transferring the private key connected to the NFT (and corresponding public key) from the previous owner/user to the new owner/user. The private key can provide the new owner/user access to the private vault that stores the metadata for the personal property.

Conventional secure databases can store metadata for a person or thing, however these secure databases often fail to support multiple levels of access by other entities. In addition, in these conventional systems, ownership of the secure database (or a credential that provides access to the secure database) is not maintained on a secure ledger, such as a blockchain.

Implementations provide NFTs that support managed access to secure metadata vaults for a person or thing. Implementations of a NFT comprise a public key that provides third-party entities predefined access (e.g., write access, read access, etc.) to the metadata vault for a person or thing. A corresponding private key can provide an authenticated user additional access to read and/or write to the secure metadata vault. Accordingly, implementations provide a security protocol that leverages both a public key that is part of a NFT and a private key. This security protocol supports multi-level access to the private vault among multiple parties. In addition, ownership changes of the NFT are maintained on a blockchain, and thus can be secured via smart contracts.

Several implementations are discussed below in more detail in reference to the figures. FIG. 1 is a block diagram illustrating an overview of devices on which some implementations of the disclosed technology can operate. The devices can comprise hardware components of a device 100 that manage a metadata vault with a non-fungible token. Device 100 can include one or more input devices 120 that provide input to the Processor(s) 110 (e.g., CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, vault manager 164, and other application programs 166. Memory 150 can also include data memory 170, e.g., blockchain data, metadata for a person or thing, identifying information for an identity and/or owner, cryptographic key(s), NFTs, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
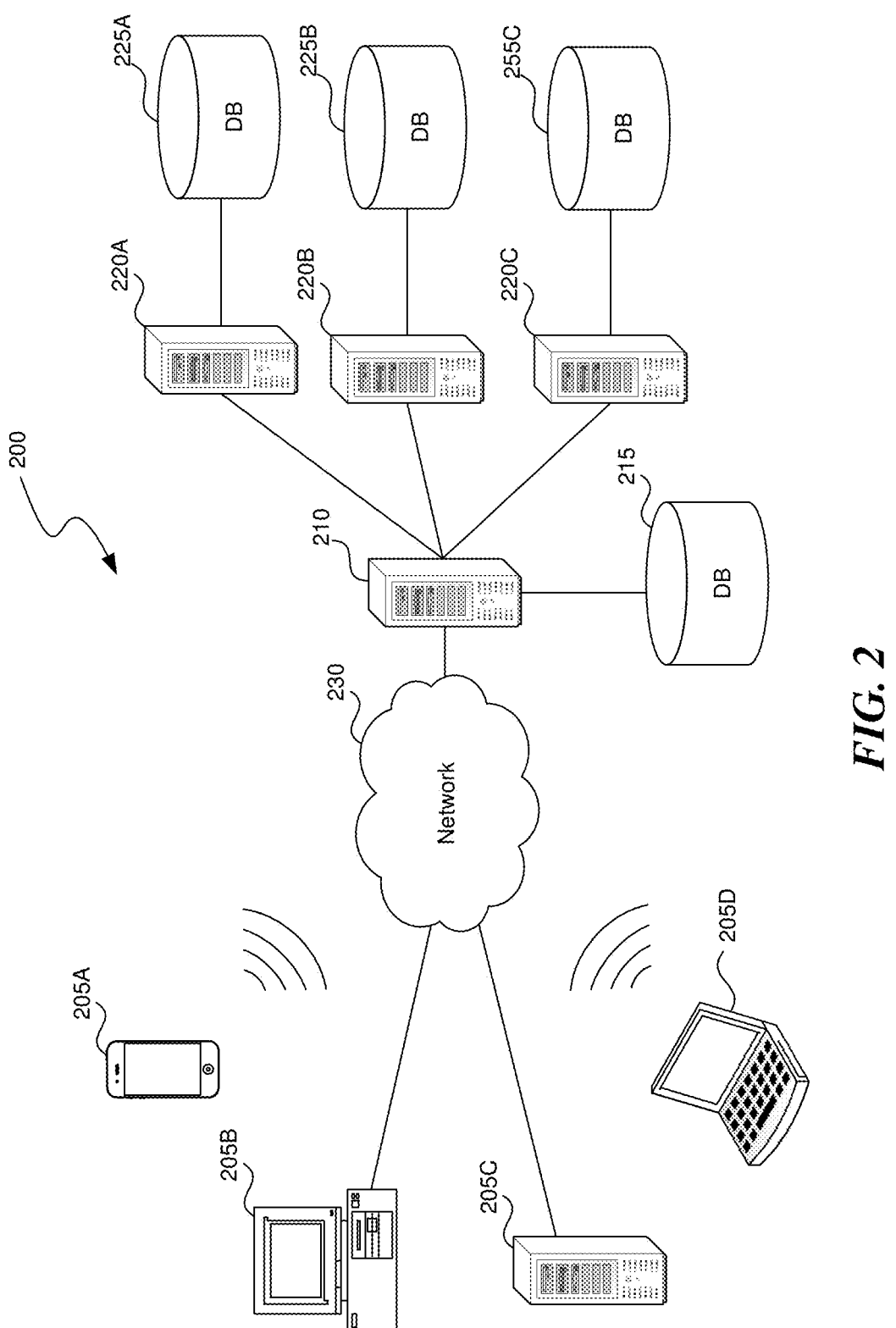
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g., store) information such as blockchain data, metadata for a person or thing, identifying information for an identity and/or owner, cryptographic key(s), NFTs, and other suitable information. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
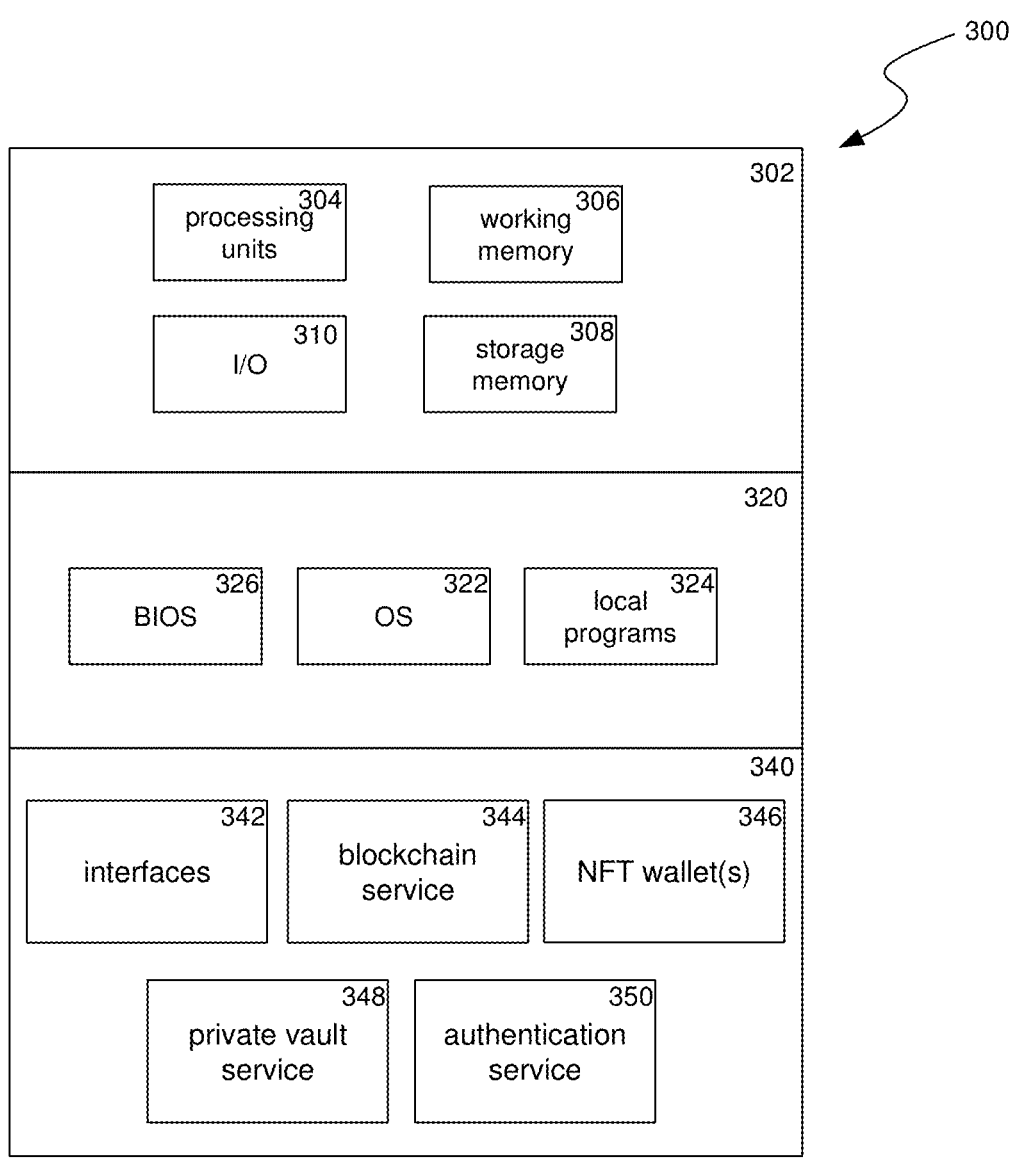
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include blockchain service 344, NFT wallet(s) 346, private vault service 348, authentication service 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

Blockchain service 344 can manage a blockchain that supports one or more NFTs. For example, blockchain service 344 can include one or more blockchain data structure(s) and smart contracts that execute in combination with the blockchain data structure(s). In some implementations, blockchain service 344 can manage a blockchain and smart contract(s) for a NFT that corresponds to a tangible person or thing (e.g., personal property, pet, etc.). For example, blockchain service 344 can record transactions for the NFT, execute smart contract(s) relative to the NFT, and the like. Example smart contract(s) can mint a NFT on the blockchain, transfer the NFT to one of NFT wallet(s) 346, such as in response to authentication from authentication service 350, and perform any other suitable transaction.

In some implementations, blockchain service 344 can issue one or more keys to a minted NFT, such as cryptographic keys. For example, blockchain service 344 can issue a public key to the minted NFT while a private key is transferred/provided to the target user of the minted NFT (e.g., authenticated user that owns the NFT wallet 346 that is set to receive the minted NFT). Blockchain service 344 can implement any other suitable symmetric key(s), asymmetric key(s), and the like. Additional details on blockchain service 344 are provided below in relation to FIGS. 4A, 4B, blocks 510, 512, 514, 516, and 518 of FIG. 5, and blocks 802, 804, 806, 808, 810, and 812 of FIG. 8.

NFT wallet(s) 346 can store NFT(s) that correspond to a tangible person or thing. For example, authentication service 350 can authenticate a user as a verified person (e.g., authenticate the identity of the person), as the owner of property (e.g., vehicle, real estate, etc.), or perform any other suitable authentication. In response to authentication from authentication service 350, blockchain service 344 can issue the user a NFT wallet 346. Once issued, blockchain service 344 can mint the NFT and transfer the minted NFT to the user's NFT wallet 346. The user's NFT wallet 346 can store the NFT until a smart contract of blockchain service 344 performs a transfer of the NFT. Additional details on NFT wallet(s) 346 are provided below in relation to FIGS. 4A, 4B, blocks 510, 512, 514, 516, and 518 of FIG. 5, and blocks 802, 804, 806, 808, 810, and 812 of FIG. 8.

Private vault service 348 can manage a private vault that stores metadata for a person or thing. For example, a private vault managed by private vault service 348 can store metadata for a vehicle (e.g., personal car, commercial vehicle, etc.), real estate (e.g., house, condominium, commercial real estate, etc.), pet (e.g., medical records, historical records, ownership records, etc.), health records for a person, and metadata for any other suitable tangible person or thing. In some implementations, private vault service 348 can secure access (e.g., read access, write access, etc.) to the private fault using a public key and a private key, or any other suitable key structure. Private vault service 348 can secure the private vault using any other suitable credential and/or security protocols. Additional details on private vault service 348 are provided below in relation to FIGS. 4A, 4B, process 600 of FIG. 6, and process 700 of FIG. 7.

Authentication service 350 can authenticate a user identity, ownership of personal property, and/or ownership of a pet. For example, in response to a user request to own/initiate a private vault (and corresponding NFT) that stores metadata comprising the health records of a person, authentication service 350 can authenticate the user identity as the person. In another example, in response to a user request to own/initiate a private vault (and corresponding NFT) that stores metadata for personal property (e.g., home, vehicle, jewelry, etc.), authentication service 350 can authenticate that the user is the owner of the personal property (e.g., original owner or new owner). Additional details on authentication service 350 are provided below in relation to FIGS. 4A, 4B, blocks 502, 504, 506, and 508 of FIG. 5, and blocks 802, 804, 806, and 808 of FIG. 8.

A blockchain is a list of records, each called a block, which can be linked through cryptography. In some blockchain implementations, each block includes a timestamp, a hash of the previous block, and transaction data. The timestamp proves that the transaction data was included when the block was added in order to get its hash. Because each block specifies the block previous to it, the set of blocks make a chain, with each new block reinforcing the set of blocks before it in the chain. Therefore, blockchains can be difficult to modify because data, once added to the blockchain, cannot be altered without altering subsequent blocks.

Non-Fungible Tokens (NFTs) are blockchain-backed identifiers specifying a unique item. Through a distributed ledger (e.g., blockchain), the ownership of these tokens can be tracked and verified. Such tokens can include an identifier of the unique item and/or link to a representation of the unique item (e.g., via a traditional URL or a distributed file system such as IPFS). While a variety of blockchain systems support NFTs, common platforms that supports NFT exchange allow for the creation of unique and indivisible NFTs.

In some implementations, a blockchain service can mint NFT(s) according to any suitable NFT protocol (e.g., Ethereum request for Comments ("ERC")-20, ERC-721, ERC-1155, protocols for other suitable blockchain implementations, etc.). The blockchain service can include an application programming interface ("API") for performing transactions relative to the NFT. In some implementations, the NFT can include a credential, such as a public key, and/or an association (e.g., web link) with a data file that stores the credential. The blockchain service can include a set of smart contracts for performing transactions relative to the NFT. A smart contract can be code that executes when a set of conditions are satisfied. The blockchain service maintains the transactions on a blockchain ledger according to the NFT protocol.

Implementations of a blockchain service mint a NFT that correspond to a tangible person or thing. The NFT can include an identifier for the tangible person or thing, such as identifying information of a person (e.g., name, birthdate, hash of a PIN or portion of a social security number, etc.), personal property (e.g., vehicle identification number (VIN), identifier for real-estate plot, such as an address, etc.), and other suitable identifying information. The NFT can also include a credential that corresponds to the tangible person or thing, such as a public key that grants access to a private vault for the tangible person or thing. In some implementations, the NFT can include a link (e.g., web link) to a data file that stores the credential (e.g., public key).

Figure 4A:
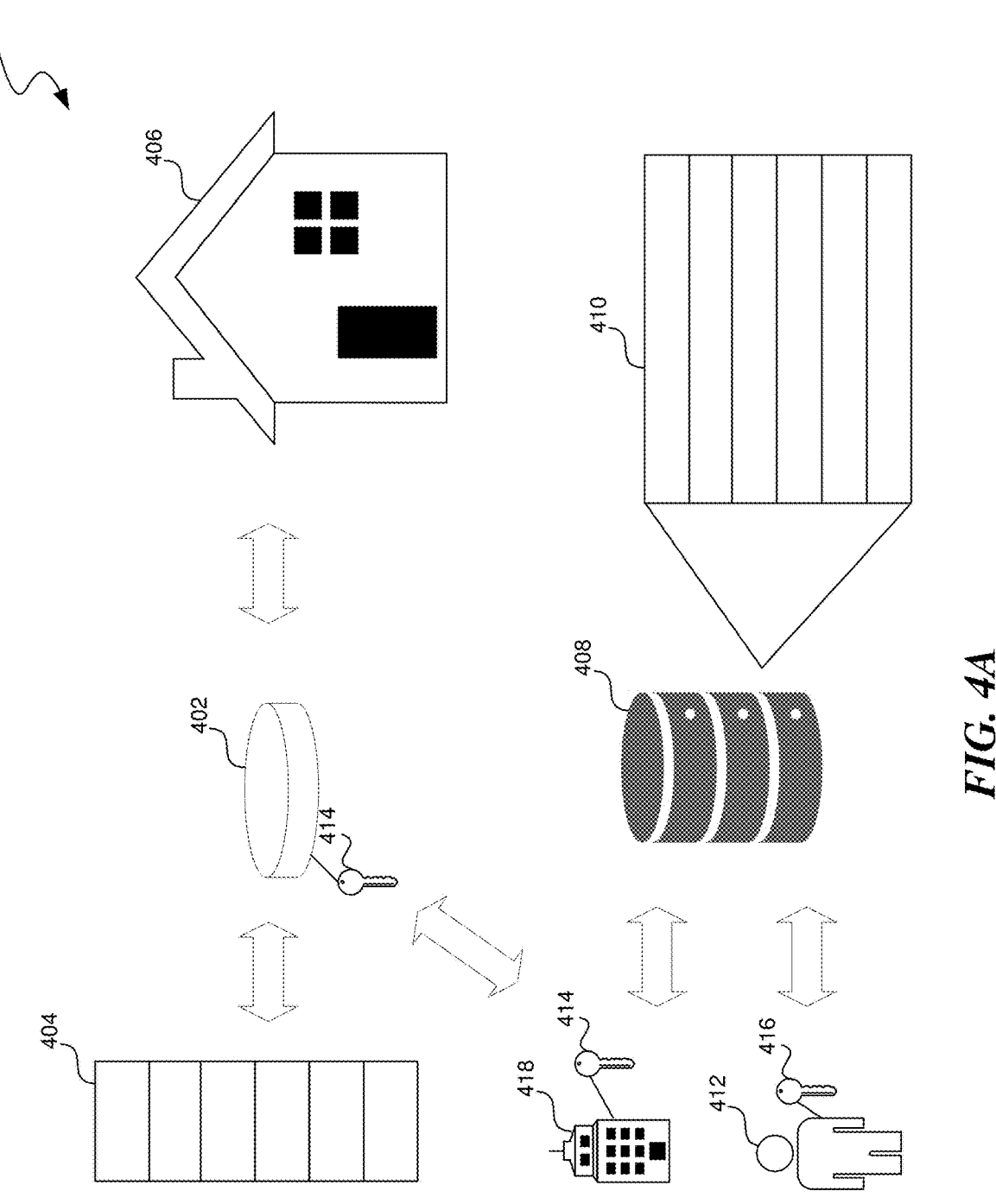
FIGS. 4A and 4B are conceptual diagrams of a non-fungible token service and a private vault manager.
Figure 4B:
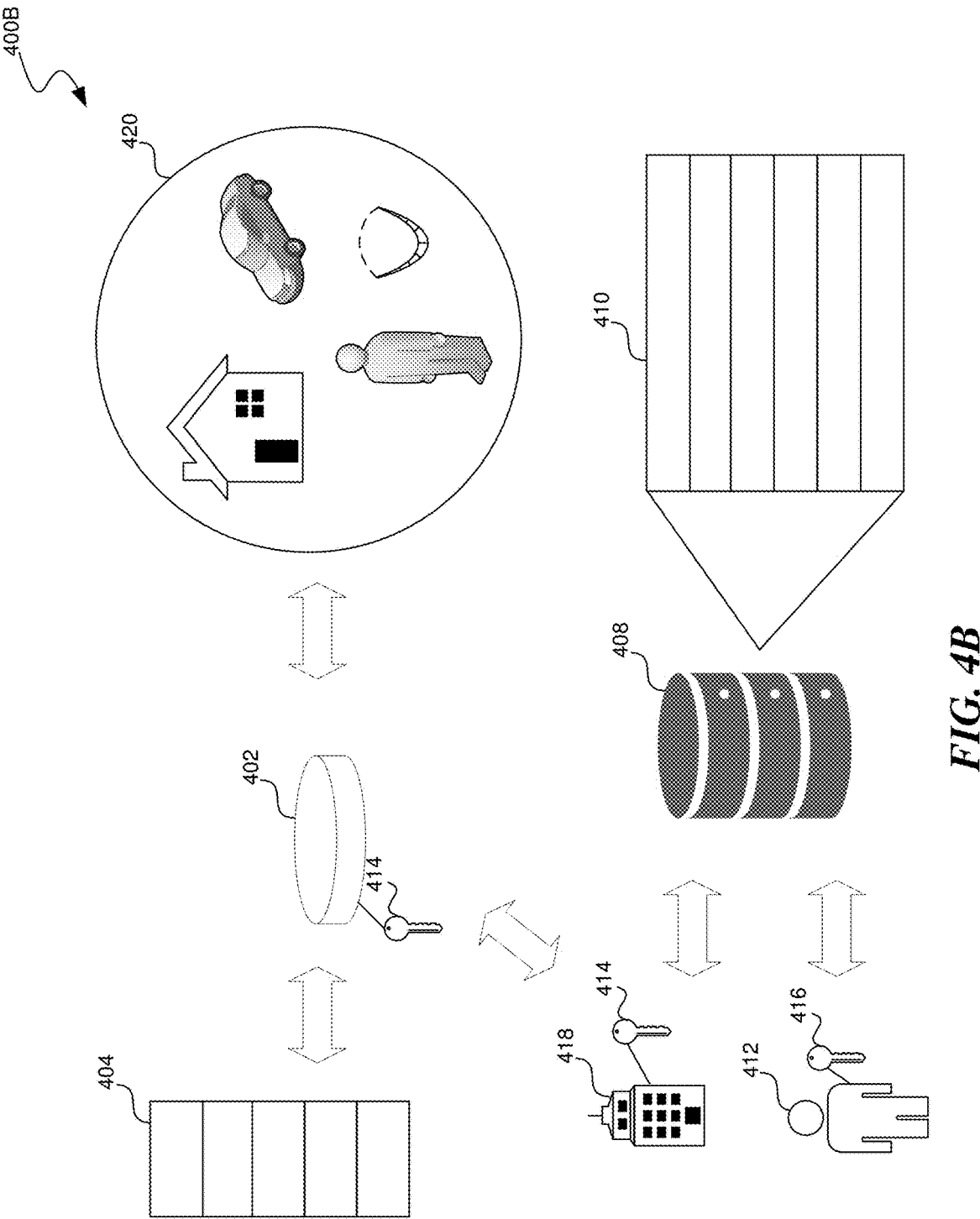

Implementations can provide a private key (that correspond to the public key) to a user, such as a user whose identity is verified, a user who is verified as the owner of personal property, and the like. The public key can provide a first level of access to the private vault (e.g., either read access or write access) and the private key can provide a second level of access to the private vault (e.g., both read access or write access). FIGS. 4A and 4B are conceptual diagrams of a non-fungible token service and a private vault manager. Diagram 400A includes NFT 402, blockchain 404, tangible property 406, private vault 408, metadata elements 410, user 412, third-party entities 418, and keys 414 and 416.

NFT 402 can be minted according to any suitable protocol, and blockchain 404 can store a ledger of transactions for NFT 402. For example, once minted NFT 402 can be transferred to a user's token wallet and the transfer transaction can be appended to blockchain 404. In some implementations, transactions involving NFT 402 can be executed by one or more smart contracts that correspond to blockchain 404. Implementations of a blockchain service can mint NFT 402, perform smart contract execution, generate token wallets for users, and perform any other suitable functionality related to blockchain 404 and NFT 402. In some implementations, key 414 can be associated with NFT 402. For example, key 414 can be a public key (e.g., part of a public and private key pair) that is included in NFT 402 (e.g., part of the NFT's data structure) and/or NFT 402 can include an identifier (e.g., web link, link to any other storage location, etc.) that refences a data file that stores key 414.

Tangible property 406, depicted in diagram 400A as a house, can be connected to NFT 402. For example, NFT 402 can include identifying information about tangible property 406 (e.g., address, plot number, unit number, city/state, other suitable identifying information, etc.). Private vault 408 can store metadata for tangible property 406, and NFT 402 can secure access to private vault 408. For example, private vault 408 can store metadata elements 410 for tangible property 406, such as blueprints, owner manuals, construction and/or maintenance records, certifications, inspection records, property titles, loan and/or lien information, zoning or agreement information (e.g., commercial zoning, residential zoning, agreements with city, county, and/or state, etc.), covenants, easements, or licenses, sensor data (e.g., sensed home conditions), warranty information (e.g., appliance, maintenance, construction, etc.), security system information, land information (e.g., utility information, underground lines for water, electricity, cable, etc.,), and any other suitable metadata relevant to real estate (e.g., residential home, commercial real estate, etc.). Implementations of NFT 402 comprise key 414, which can be a public key that provides third-party entities 418 access to private vault 408.

Third-party entities 418 can include maintenance entities (e.g., companies, people, etc.), construction companies, financial institutions, government entities, assessors or inspectors, or any other suitable entities related to real-estate records. The third-party entities can inspect/access NFT 402 to retrieve key 414. Using key 414, third-party entities 418 can submit access requests (e.g., read requests, write requests, etc.) to private vault 408. Key 416 can comprise a private key that corresponds to key 414 (e.g., a public key). Using key 416, user 412 can submit access requests (e.g., read requests, write requests, etc.) to private vault 408. Keys 414 and 416 can provide different levels of access to private vault 408. In a first example, key 414 can provide write access to private vault 408 and key 416 can provide read access to private vault 408. In a second example, key 414 can provide read access to private vault 408 and key 416 can provide write access to private vault 408. Keys 414 and 416 can provide any other suitable access levels to private vault 408.

In some implementations, third-party entities 418 can add metadata to private vault 408, such as records for tangible property 406, using permissions granted to key 414 (e.g., write permissions). Key 414 can permit user 412 to read this metadata stored at private vault 408 by third-party entities 418. In this example, private vault 408 can act as a repository for records, documents, or other suitable metadata that is relevant to the owner of tangible property 406 (i.e., user 412). Key 416, or the private key possessed by user 412, permits user 412 to read this metadata relevant to tangible property 406 to support user 412's management of the property.

In other examples, third-party entities 418 can read metadata stored at private vault 408 using permissions granted to key 414 (e.g., read permissions). For example, user 412 can store metadata at private vault 408 using key 416, and this stored metadata can be read by third-party entities 418 using key 414. In some implementations, key 416 issued to user 412 (e.g., private key) can comprise read access and write access.

Diagram 400B includes NFT 402, blockchain 404, person or thing 420, private vault 408, metadata elements 410, user 412, third-party entities 418, and keys 414 and 416. Diagram 400B can be similar to 400A, however NFT 402 and private vault 408 can correspond to any suitable person or thing 420, such as a vehicle (e.g., car, boat, motorcycle, plane, etc.), a pet, a person, jewelry, a collectible or memorabilia, or any other suitable tangible person or thing. In this example, the metadata stored at private vault 408 (e.g., stored by third-party entities 418 using key 414) can include metadata for the person or thing 420.

In an example, person or thing 420 can be a vehicle and the metadata stored at private vault 408 can include maintenance records, a vehicle feature list, part numbers, registration information, certifications, insurance information (e.g., insurance carrier, claim history, etc.), sensor data from the vehicle (e.g., speed history, motion history, braking metrics, etc.), mileage accumulation history (e.g., when miles are accumulated), title information, and other suitable vehicle metadata. In another example, person or thing 420 can be a person, and metadata stored at private vault 408 can include medical history (e.g., test results, known conditions, past surgeries, etc.), location data (e.g., where person resided in previous years), education history (e.g., undergraduate, graduate, post-graduate, certifications, etc.), family history (e.g., illnesses, conditions, etc.), biometric data (e.g., history of sensed biometric data from a sensor/smartwatch, pacemaker, etc.), emergency contact information, medication list and/or history, or any other suitable personal metadata.

In another example, person or thing 420 can be a pet, and metadata stored at private vault 408 can include medical history (e.g., test results, known conditions, past surgeries, etc.), location data (e.g., where pet resided in previous years), family history (e.g., illnesses, conditions, etc.), biometric data (e.g., history of sensed biometric data from wearable sensor, etc.), owner contact information, medication list and/or history, diet information, or any other suitable pet metadata. In another example, person or thing 420 can be memorabilia (e.g., collectible card, stamp, figurine, signed memorabilia, or other suitable collectible) or jewelry, and the metadata can include authenticity information (e.g., jewelry authenticity certification, memorabilia authenticity certification, etc.), quality certification (e.g., jewelry quality certification, memorabilia condition certification, etc.), proof of ownership information, bill of sale, or other suitable metadata.

In these examples, third-party entities 418 can access private vault 408 using key 414 (e.g., a public key from a minted NFT) to write metadata for person or thing 420 to private vault 408 and/or read metadata for person or thing 420 from private vault 408. User 412 can access private vault 408 using key 416 (e.g., a private key paired to the public key) to write metadata for person or thing 420 to private vault 408 and/or read metadata for person or thing 420 from private vault 408.

Some implementations include multiple private vaults for multiple person(s) or thing(s). For example, an individual user can provide verifying information for the user's identity, verifying information that demonstrates the user owns a home, and verifying information that the user owns a car. In some implementations, the private vault manager can manage the user's: health records metadata, home metadata, and vehicle metadata. For example, a separate private vault can manage each of the user's health records metadata, home metadata, and vehicle metadata. In this example, each private vault can be tied to the person (e.g., health records) or thing (e.g., home or vehicle) by the public key used to secure the private vault and the NFT that corresponds to the public key. For example, a blockchain service can mint a NFT for each of the person's health records, the user's home, and the user's vehicle, and each NFT can include: a public key tied to the person or thing; and verifying information about the person or thing.

Third-party entities can access each individual private vault by providing the public key that is: part of the NFT; and corresponds to the private vault. In some implementations, a third-party entity can write to the private vault using the corresponding public key. In this example, a user can access the private vault with a private key (e.g., that corresponds to the public key) and read/retrieve the metadata stored by the third-party entity. In some implementations, a user can write to the private vault using the private key. In this example, the third-party entity can access the private vault using the public key (e.g., that corresponds to the private key) and read/retrieve the metadata stored by the user.

In some implementations, the private vault manager can secure each private vault with the public key and a secondary credential that is relative to the requesting third-party entity. For example, third-party entities can comprise a secondary credential (e.g., access token, private key, etc.) that verifies their access to one or more private vault(s), one or more metadata elements of the private vault(s), or any combination thereof. The secondary credential can verify that the third-party is a member of a group with access to one or more private vaults.

An authentication service can authenticate that a third-party entity is part of a group with predefined private vault access privileges, such as medical providers, vehicle mechanics, home inspectors, construction companies, jewelry/collectible appraisers, or any other suitable group. The authentication service can issue the third-party entity a credential that verifies membership in one of these groups. For example, once authenticated, a third-party entity can be issued a credential that verifies that the third-party entity is a medical provider. The credential can be a private key, an access token (e.g., security access markup language (SAML) token, OAuth 2.0 toke, etc.), or any other suitable credential.

In some implementations, when a request to access a private vault is received at a private vault manager that includes a public key, the private vault manager can validate both the public key for the private vault (e.g., that is part of the NFT) and the secondary credential of the requesting entity. Verifying the public key can include verification that the request includes the public key from the NFT tied to the person or thing that corresponds to the private vault. Verifying the secondary credential can include verifying that the request includes a secondary credential scoped with access permission (e.g., read permission, write permission, etc.) to the private vault. For example, the secondary credential can be issued to a group that comprises a set of permissions, one of which can be access permission for the private vault. In some implementations, the secondary credential can be verified by authenticating that a cryptographic signature that is part of the request was generated using the secondary credential.

In some implementations, different secondary credentials (e.g., corresponding to different groups) can be permitted different access to a private vault. For example, a first group associated with a first secondary credential can comprise read access for a first portion of metadata elements and write access to the private vault, and a second group associated with an other secondary credential can comprise read access for an other portion of metadata elements (e.g., different from the first portion) and no write access to the private vault. Upon validation of the secondary credential, the private vault manager can permit the requesting third-party entity the private vault access that corresponds to the provided secondary credential.

In some implementations, the private vault manager can store metadata for a digital item, such as a photograph, image, video, three-dimensional model, and the like. For example, a NFT can comprise a reference to the digital item (e.g., web link to the storage location of the digital item) and a public key that provides access to the private vault that manages metadata for the digital item. Metadata for the digital item, such as a photograph, can include a capture timestamp for the photograph, capture location, identities for individuals included in the photograph, device identifier for camera/device that captured the photograph, or any other suitable metadata.

In some implementations, when a NFT includes a web link, the hash of the web link (e.g., URL, URI, etc.) can be included in the NFT at the time of minting. This techniques can validate that the NFT and weblink have been consistent throughout the existence of the NFT.

In some implementations, identifying information for a person or thing included in an NFT can comprise a hash of the identifying information, such as a hash of a social security number, address, photo identification, certification record, registration record, bill of sale, property transfer record, or any other suitable identifying information. In this example, a user with the underlying identifying information can confirm that the NFT includes a hash of the information.

Those skilled in the art will appreciate that the components illustrated in FIGS. 1-3, 4A, and 4B described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
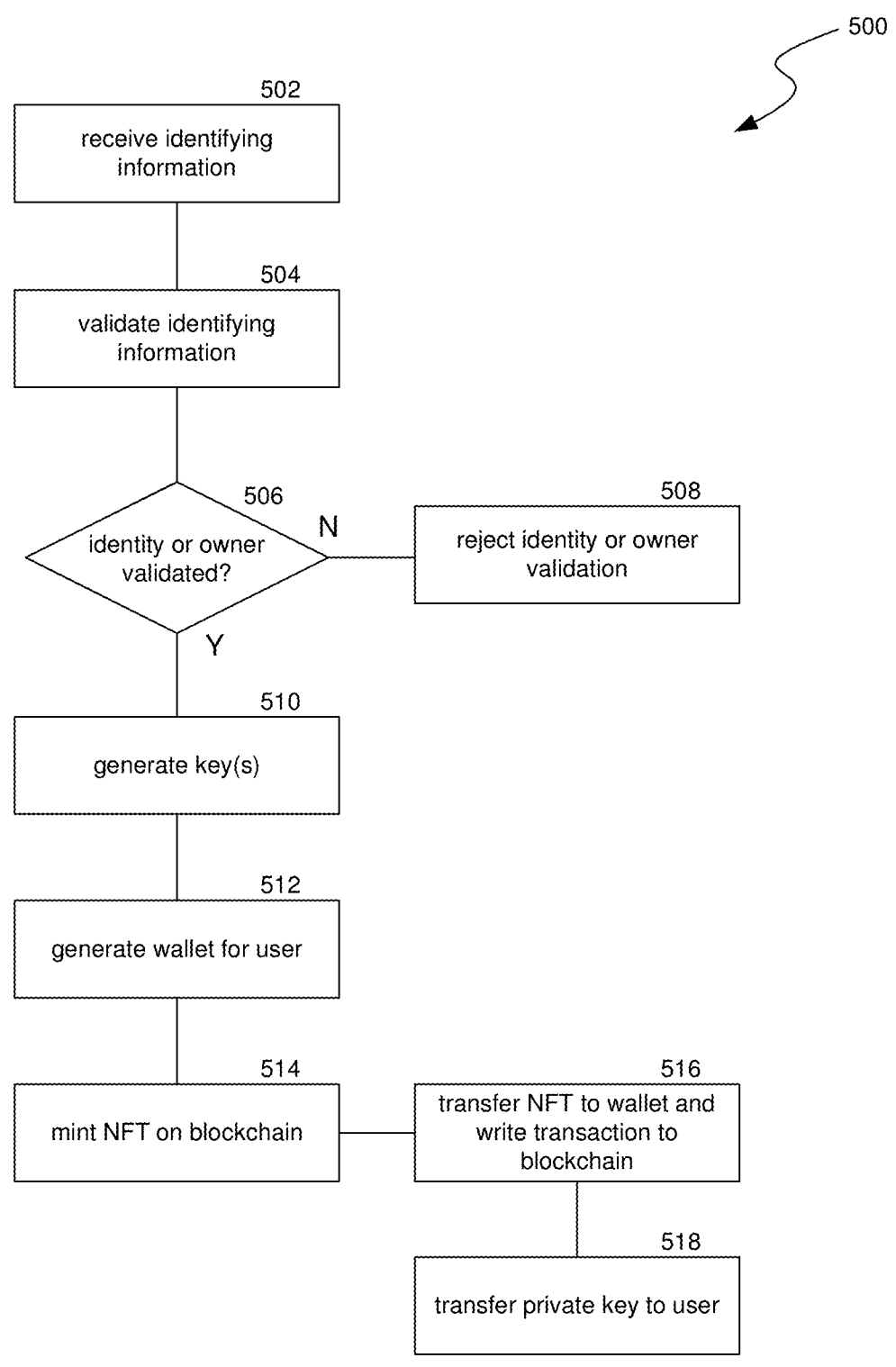
FIG. 5 is a flow diagram illustrating a process used in some implementations for authenticating a person or owner for issuance of a non-fungible token.

FIG. 5 is a flow diagram illustrating a process used in some implementations for authenticating a person or owner for issuance of a non-fungible token. In some implementations, process 500 can be performed in response to a request for a NFT and/or a request for identity/owner authentication. Portions of process 500 can be performed by a blockchain service, an authentication service, a private vault manager, or any combination thereof.

At block 502, process 500 can receive identifying information for a person or thing. For example, a request for authenticating a user as a specific person (e.g., identity), owner of personal property, or pet owner can include identifying information that supports the request. The identifying information that supports a request to authenticate a user as a specific person identity can include one or more images, a video, a social security number, financial information, a thumbprint, multiple forms of photo identification credentials, employment history, tax history, education history, residence history, an eye or body scan, biometric information, or any other suitable personal identification information. Example identifying information that supports a request to authenticate a user as an owner (e.g., property owner, pet owner, etc.) can include title records (e.g., vehicle title, real-estate title, memorabilia or jewelry title, etc.), bill of sale, certification records, authentication records, adoption records (e.g., pet adoption), registration information (e.g., vehicle, pet, etc.), tax records (e.g., real-estate tax, vehicle tax, etc.), financial information (e.g., mortgage, vehicle loan, etc.), or other suitable ownership information.

At block 504, process 500 can validate the identifying information. For example, an authentication service can validate that the request is from a specific person identity and/or that the request is from the owner of personal property or a pet. In some implementations, validation can include comparing the received information to one or more criteria. For example, to validate the identity of a person, the criteria for identifying information can include at least: two forms of picture identification, social security number, employment history, residential history, and two or more of tax records, mortgage or bank accounts records, or utility bills. In another example, to validate that a person is an owner of property the criteria for identifying information can include at least: a form of picture identification, social security number, title records, mortgage or financial instruments related to the property, and an image of the property. In some implementations, the criteria to validate ownership of property can include portions or all of the criteria to validate a person's identity.

In some implementations, the validation can include authentication of individual elements of the received identifying information. For example, the authentication service can authenticate one or more of: a picture identification of a user (e.g., government issued state identification, such as a driver's license or passport), tax records, title records, financial records, employment history, residential history, and the like. In some implementations, a background check (e.g., automated search of databases, manual search of public data, etc.) can authenticate one or more individual elements of the received identifying information. In another example, the provided identifying information can be compared to a template, such as a template for a state issued identification (e.g., passport, driver's license, etc.) to determine authenticity. In some implementations, a computer vision model can be trained to detect the authenticity of state issued identification, and the computer vision model can output a predicted authenticity.

At block 506, process 500 can determine whether the identity and/or ownership is verified. For example, the authenticity of individual elements of the received identifying information can be assessed and the overall received identifying information can be compared to a criteria to assess whether the received information is sufficient to establish identity and/or ownership. When the authenticity of individual elements of identifying information is verified and the totality of the identifying information meets the criteria, the identity and/or ownership can be verified.

When the identity and/or ownership is verified, process 500 can progress to block 510. When the identity and/or ownership is not verified, process 500 can progress to block 508, where the identity or owner validation can be rejected. For example, the request for validation, authentication, and/or a NFT can be rejected. In some implementations, a message that describes the validation results can be transmitted to the requesting entity/computing device.

At block 510, process 500 can generate keys, such as cryptographic keys. For example, a pair of keys, such as a public key and a private key, can be generated. The pair of keys can be generated by the authentication service, a blockchain service, or any other suitable service. The keys can be generated according to the Rivest-Shamir-Adleman ("RSA") protocol, Public-Key Cryptography Standard ("PKCS"), or any other suitable key protocol.

At block 512, process 500 can generate a wallet for the requesting user. For example, a blockchain service can generate the wallet for the requesting user in response to the authentication performed by the authentication service. In some implementations, the authentication service can generate a call (e.g., API call) that comprises the request and an authentication result (e.g., verification indicator) that initiates the generation of the token wallet for the user.

In some implementations, the authentication service can comprise a blockchain wallet and/or a token issued by the blockchain service. For example, the authentication service and blockchain service can comprise an existing trusted relationships. In some implementations, the blockchain service can issue a token to the authentication service, such as a unique token (e.g., NFT or other suitable token) that identifies the token holder as an authentication service. In this example, the blockchain service can also generate a token wallet for the authentication service such that the issued token can be stored at the token wallet. A call (e.g., smart contract call, API call, or any other suitable call) from the authentication service to the blockchain service can initiate the generation of the token wallet for the requesting user. For example, the call can include the user request, the authentication service token, an identifier for the token wallet issued to the authentication service, or any other suitable information. The blockchain service can trigger generation of the token wallet for the requesting user in response to the call that includes credentials from the trusted authentication service (e.g., unique token, token wallet identifier, etc.).

At block 514, process 500 can mint a NFT on a blockchain that corresponds to the person identity, owned property, or pet. For example, the minted NFT can include identifying information about the user identity, owned property, or pet. The identifying information for a person identity included in the minted NFT can include name, birthdate, hash of a PIN or portion of a social security number, image of the person, or any other suitable identifying information for a person.

The identifying information for owner property included in the minted NFT can include a vehicle identification number (VIN), identifier for real-estate plot, such as an address, plot identifier, description of memorabilia or jewelry, authenticity certificates, bill of sales, or any other suitable identifying information for personal property. The identifying information for a pet included in the minted NFT can include adoption records, biographic information (e.g., breed, history of weight, etc.), name(s), an image of the pet, location history, description of pet appearance, or any other suitable pet identifying information.

In some implementations, the minted NFT can also include the generated public key. For example, the NFT can include the data that represents the public key itself or a link (e.g., web link) to a data file that stores the credential (e.g., public key).

At block 516, process 500 can transfer the minted NFT to the generated wallet for the requesting user and write the transaction to a blockchain. For example, the blockchain service can transfer the minted NFT to the wallet generated for the user and append a block to a blockchain that comprises a ledger of transactions for the minted NFT. The transfer of the minted NFT and appending of the transaction to the blockchain can be part of a smart contract triggered by a call from the authentication service and/or the request from the user.

At block 518, process 500 can transfer one or more of the generated keys to the requesting user. For example, the requesting user can receive a private key that corresponds to the public key that is included in the minted NFT. The private key and public key can provide different levels of access (e.g., read access, write access, etc.) to a private vault for the validated identity, personal property, pet, or any other tangible person or thing.

Figure 6:
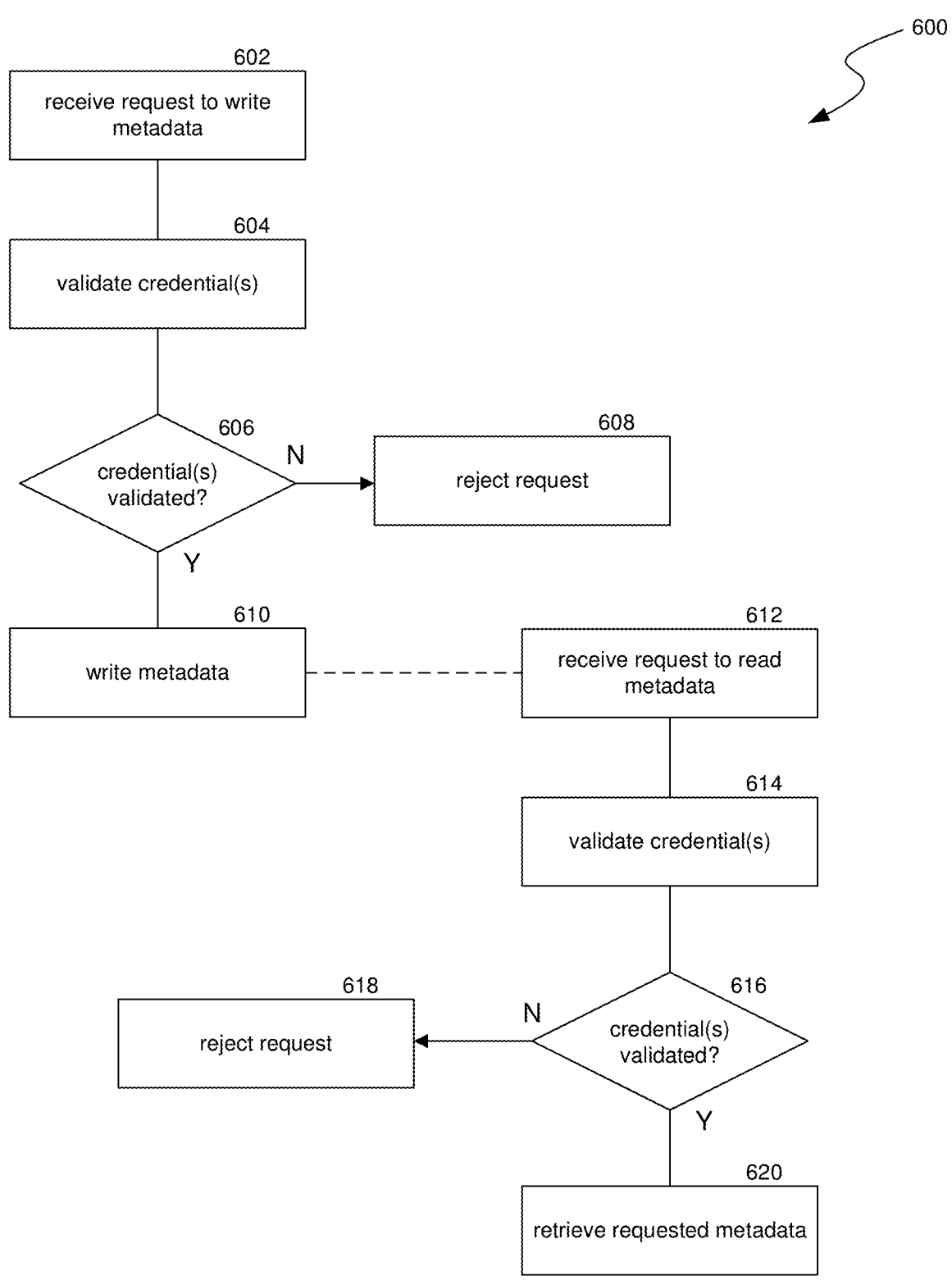
FIG. 6 is a flow diagram illustrating a process used in some implementations for securing metadata vault write access with a non-fungible token and metadata vault read access with a private key.

FIG. 6 is a flow diagram illustrating a process used in some implementations for securing metadata vault write access with a non-fungible token and metadata vault read access with a private key. In some implementations, process 600 can be performed in response to an access request for a managed private vault. Process 600 can be performed by a private vault manager executing at a server or any other suitable computing device.

At block 602, process 600 can receive a request to write metadata to a private vault. For example, a private vault manager can secure a private vault that stores metadata for a tangible person or thing. The private vault can be secured by a private key and a NFT comprising a public key. The NFT can be connect to the tangible person or things. For example, data identifying the tangible person or thing can be included in the minted NFT. The public key can be permitted write access to the private vault, and the private key can be permitted read access to the private vault. In some implementations, the private key is permitted write access and read access to the private vault. In some implementations, the private vault manager can receive a request to write metadata about the tangible person or thing to the private vault. The write request can include credential(s), such as a first primary credential and a secondary credential, and the metadata that is part of the write request.

At block 604, process 600 can validate the credential(s) received with the write request. For example, the private vault manager can validate that the first primary credential received with the write request is the public key from the NFT. Any suitable technique can be used to validate the first primary credential as the public key. For example, the write request can include a signature using the public key, and the private vault manager can validate that the signature was generated using the public key. In another example, the private vault manager can comprise the private key paired to the public key, and the private vault manager can validate the public key using the private key.

In some implementations, a secondary credential can be included in the received write request, and the private vault manager can validate the secondary credential. For example, the private vault manager can secure access to a private vault with a primary credential (e.g., a public key or private key) and a secondary credential that is relative to the user/entity requesting access (e.g., access token, private key, etc.). In some implementations, the secondary credential can verify that the requesting user/entity is a member of a group with access privileges (e.g., read privileges, write privileges, etc.) for the private vault.

In some implementations, different secondary credentials can be issued to different group members, where each secondary credential provides private vault access permissions that correspond with the group members. For example, where the private vault stores personal medical metadata, the secondary credential permitted access can verify the requester as a medical provider. In another example, where the private vault stores vehicle metadata, the secondary credential permitted access can verify the requester as a mechanic, dealer, inspector, government entity (e.g., Department of Motor Vehicles), or other entity suitable to add metadata to a vehicle metadata repository.

At block 606, process 600 can determine whether the credential(s) are validated. For example, the private vault manager can determine whether the first primary credential is validated as the public key from the NFT (e.g., connected to the tangible person or thing). In some implementations, the private vault manager can also determine whether the secondary credential comprises the permissions to write to the private vault for the person or thing. When the credential(s) are validated, process 600 can progress to block 610. When the credential(s) are not validated, process 600 can progress to block 608, where the request to write metadata is rejected. For example, a message that describes the validation results can be transmitted to the requesting entity/computing device.

At block 610, process 600 can write the requested metadata to the private vault. For example, the vault manager can write the metadata from the request to the private vault for the person or thing. The written metadata can comprise a timestamp, an identifier for the entity (e.g., requesting entity) that provided the write request and metadata, and any other suitable information.

At block 612, process 600 can receive a request to read metadata from the private vault. For example, the read request can be received by the private vault manager at some point in time after the write request. The read request can include credential(s), such as a second primary credential.

At block 614, process 600 can validate credential(s) received with the read request. For example, the private vault manager can validate that the second primary credential received with the read request is the private key that corresponds to the public key that is comprised by the NFT connected to the tangible person or thing. The read request can include a signature using the private key, and the private vault manager can validate that the signature was generated using the private key. Any other suitable technique can be used to validate the second primary credential as the private key.

At block 616, process 600 can determine whether the credential(s) are validated. For example, the private vault manager can determine whether the second primary credential from the read request is validated as the private key. When the credential(s) are validated, process 600 can progress to block 620. When the credential(s) are not validated, process 600 can progress to block 618, where the request to read metadata is rejected. For example, a message that describes the validation results can be transmitted to the requesting entity/computing device.

At block 620, process 600 can retrieve the requested metadata from the private vault. For example, the private vault manager can retrieve the metadata requested the by requesting entity that provided the private key and provide the metadata to the requesting entity (e.g., a computing device that issued the request). In some implementations, a log of the retrieved metadata can be stored by the private vault manager that comprises a timestamp, an identifier for the requesting entity, and the retrieved metadata elements.

Figure 7:
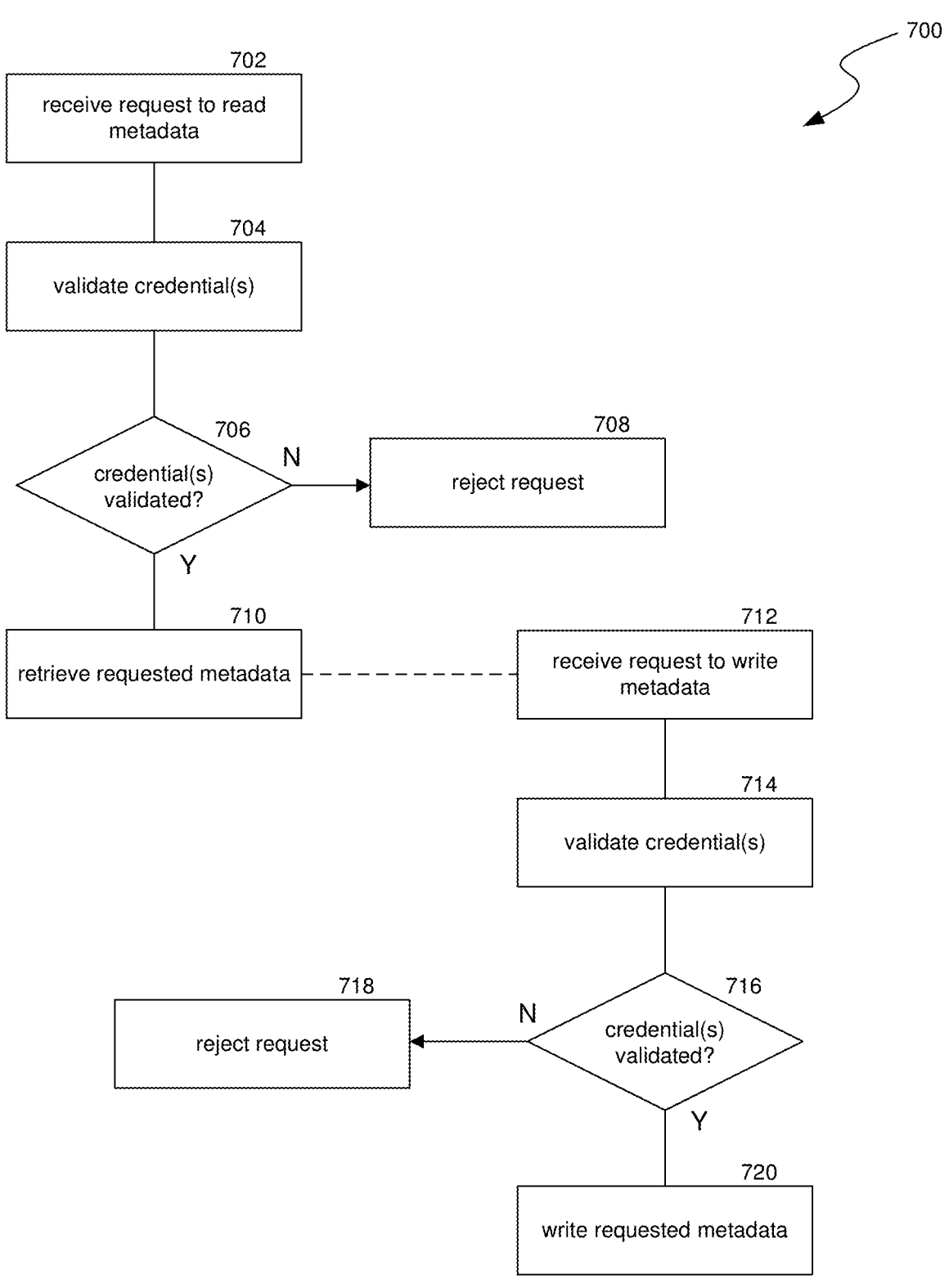
FIG. 7 is a flow diagram illustrating a process used in some implementations for securing metadata vault read access with a non-fungible token and metadata vault write access with a private key.

FIG. 7 is a flow diagram illustrating a process used in some implementations for securing metadata vault read access with a non-fungible token and metadata vault write access with a private key. In some implementations, process 700 can be performed in response to an access request for a managed private vault. Process 700 can be performed by a private vault manager executing at a server or any other suitable computing device.

At block 702, process 700 can receive a request to read metadata from a private vault. For example, a private vault manager can secure a private vault that stores metadata for a tangible person or thing. The private vault can be secured by a private key and a NFT comprising a public key. The NFT can be connect to the tangible person or things. For example, data identifying the tangible person or thing can be included in the minted NFT. The public key can be permitted read access to the private vault, and the private key can be permitted write access to the private vault. In some implementations, the private key is permitted write access and read access to the private vault. In some implementations, the private vault manager can receive a request to read metadata about the tangible person or thing from the private vault. The read request can include credential(s), such as a first primary credential and a secondary credential.

At block 704, process 700 can validate the credential(s) received with the read request. For example, the private vault manager can validate that the first primary credential received with the read request is the public key from the NFT. Any suitable technique can be used to validate the first primary credential as the public key. For example, the read request can include a signature using the public key, and the private vault manager can validate that the signature was generated using the public key. In another example, the private vault manager can comprise the private key paired to the public key, and the private vault manager can validate the public key using the private key.

In some implementations, a secondary credential can be included in the received read request, and the private vault manager can validate the secondary credential. For example, the private vault manager can secure access to a private vault with a primary credential (e.g., a public key or private key) and a secondary credential that is relative to the user/entity requesting access (e.g., access token, private key, etc.). In some implementations, the secondary credential can verify that the requesting user/entity is a member of a group with access privileges (e.g., read privileges, write privileges, etc.) for the private vault.

In some implementations, different secondary credentials can be issued to different group members, where each secondary credential provides private vault access permissions that correspond with the group members. For example, where the private vault stores personal medical metadata, the secondary credential permitted access can verify the requester as a medical provider. In another example, where the private vault stores vehicle metadata, the secondary credential permitted access can verify the requester as a mechanic, dealer, inspector, government entity (e.g., Department of Motor Vehicles), or other entity suitable to read metadata from a vehicle metadata repository.

At block 706, process 700 can determine whether the credential(s) are validated. For example, the private vault manager can determine whether the first primary credential is validated as the public key from the NFT (e.g., connected to the tangible person or thing). In some implementations, the private vault manager can also determine whether the secondary credential comprises the permissions to read metadata from the private vault for the person or thing. When the credential(s) are validated, process 700 can progress to block 710. When the credential(s) are not validated, process 700 can progress to block 708, where the request to read metadata is rejected. For example, a message that describes the validation results can be transmitted to the requesting entity/computing device.

At block 710, process 700 can retrieve the requested metadata from the private vault. For example, the private vault manager can retrieve the metadata requested the by requesting entity that provided the public key and provide the metadata to the requesting entity (e.g., a computing device that issued the request). In some implementations, a log of the retrieved metadata can be stored by the private vault manager that comprises a timestamp, an identifier for the requesting entity, and the retrieved metadata elements.

At block 712, process 700 can receive a request to write metadata to the private vault. For example, the write request can be received by the private vault manager at some point in time after the read request. The write request can include credential(s), such as a second primary credential.

At block 714, process 700 can validate credential(s) received with the write request. For example, the private vault manager can validate that the second primary credential received with the write request is the private key that corresponds to the public key that is comprised by the NFT connected to the tangible person or thing. The write request can include a signature using the private key, and the private vault manager can validate that the signature was generated using the private key. Any other suitable technique can be used to validate the second primary credential as the private key.

At block 716, process 700 can determine whether the credential(s) are validated. For example, the private vault manager can determine whether the second primary credential from the write request is validated as the private key. When the credential(s) are validated, process 700 can progress to block 720. When the credential(s) are not validated, process 700 can progress to block 718, where the write request is rejected. For example, a message that describes the validation results can be transmitted to the requesting entity/computing device.

At block 720, process 700 can write the requested metadata to the private vault. For example, the vault manager can write the metadata from the request to the private vault for the person or thing. The written metadata can comprise a timestamp, an identifier for the entity (e.g., requesting entity) that provided the write request and metadata, and any other suitable information.

Figure 8:
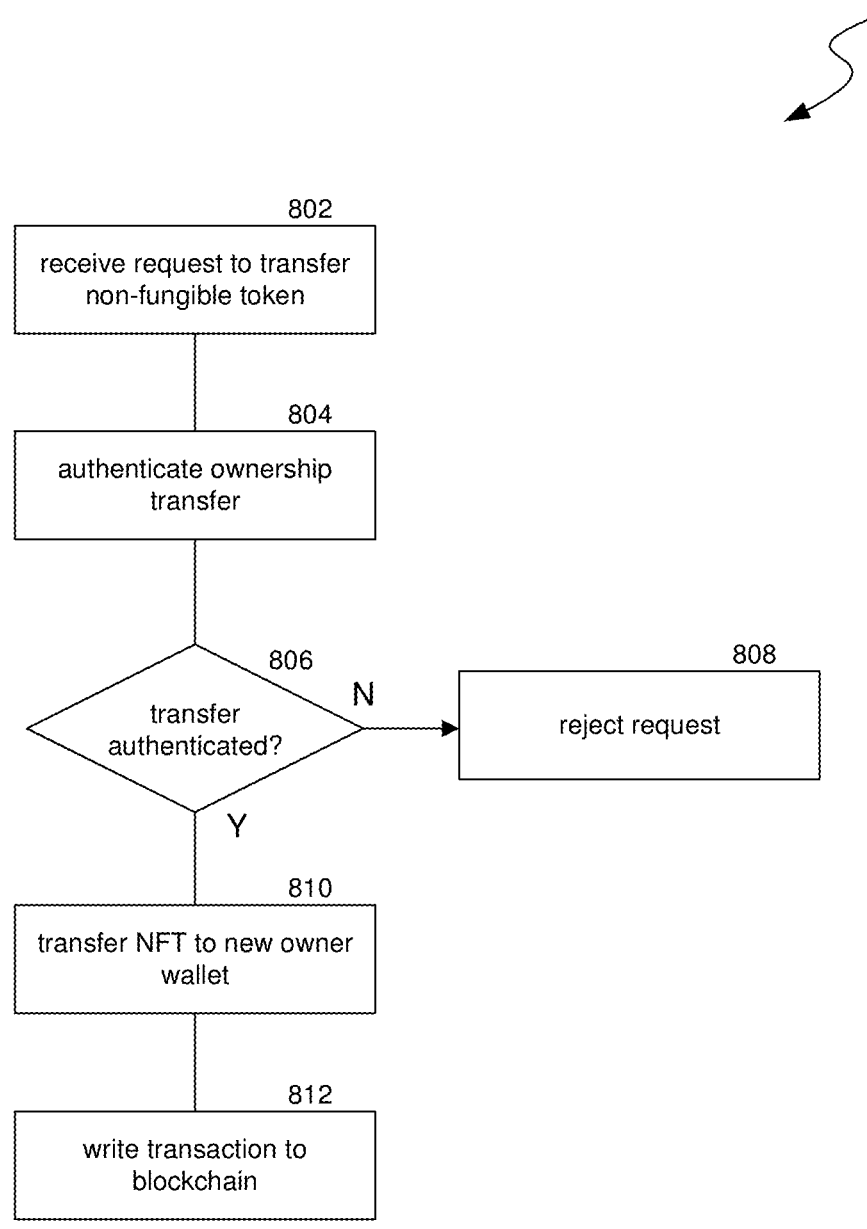
FIG. 8 is a flow diagram illustrating a process used in some implementations for transferring ownership of a non-fungible token used to manage access to a private metadata vault.

FIG. 8 is a flow diagram illustrating a process used in some implementations for transferring ownership of a non-fungible token used to secure access to a private metadata vault. In some implementations, process 800 can be performed in response to a request to transfer a NFT, a private key, and/or ownership of a private vault. In some implementations, process 800 can be performed by a blockchain service executed at a server or any other suitable computing device.

At block 802, process 800 can receive a request to transfer a NFT from an existing wallet to a new wallet. For example, the blockchain service can receive a transfer request for a NFT connected to a person or thing (e.g., comprising identifying information for the person or thing). The transfer request can be part of a call to a smart contract with one or more conditions.

In some implementations, the transfer request can be received from an authentication service that authenticates one or more components of the transfer. For example, the authentication service can verify the authenticity of a title transfer, adoption paper transfer, a bill of sale, or other suitable record(s) that demonstrate property transfer from an existing owner to a new owner. In some implementations, the authentication service can also authenticate one or more of the identity of the person/user that owns the NFT, and the identity of the person/user being transferred the NFT. When the authentication service verifies the person/user identities and the ownership transfer, the authentication service can transmit the transfer request to the blockchain service (e.g., as a smart contract call). In some implementations, the transfer request can include one or more credentials from the authentication service, such as a unique token that verifies the requester as the authentication service, a token wallet identifier for the authentication service, or any other suitable credential. The transfer request can also comprise token wallet identifiers for the existing NFT owner and the new NFT owner.

At block 804, process 800 can authenticate conditions for ownership transfer. For example, the blockchain service can assess whether the conditions for a smart contract that controls ownership transfer of the NFT are met. Example smart contract conditions include an originating token wallet that the blockchain validates owns the NFT, a new token wallet that is a valid user token wallet, and other suitable conditions. In some implementations, example smart contract conditions include an originating token wallet that the blockchain validates owns the NFT, a new token wallet that is a valid user token wallet, and a unique token included in the request that corresponds to an authentication service (e.g., a trusted authentication service registered with the blockchain service).

At block 806, process 800 can determine whether conditions for ownership transfer are met. For example, the blockchain service can evaluate the conditions for the smart contract and determine whether each condition is met. When conditions for ownership transfer are met, process 800 can progress to block 810. When conditions for ownership transfer are not met, process 800 can progress to block 808, where the transfer request is rejected. For example, a message that describes the smart contract condition results can be transmitted to the requesting entity/computing device.

At block 810, process 800 can transfer the NFT from the existing token wallet to the new token wallet. For example, the blockchain service can initiate the transfer of the NFT from the existing token wallet affiliated with the existing owner user/person to the new token wallet affiliated with the new owner user/person in response to the smart contract conditions being met. At block 812, process 800 can append the transfer transaction to the blockchain. For example, the blockchain service can append the transaction that reflects the NFT ownership transfer from the old token wallet to the new token wallet to the blockchain to maintain the ledger for the NFT. In some implementations, the transaction can include an identifier for the authentication service that authenticated portions of the ownership transfer request.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for securing a metadata vault with a non-fungible token, the method comprising:

storing, at a private vault, metadata for tangible property, wherein the private vault is secured by a private key and a non-fungible token comprising a public key, and wherein the public key permits write access to the private vault and the private key permits read access to the private vault;

receiving a first request to write a metadata about the tangible property to the private vault, wherein the first request comprises a first credential;

validating the first credential as the public key from the non-fungible token;

permitting, in response to the validating the first credential as the public key, the first request to write the metadata about the tangible property to the private vault;

receiving a second request to retrieve at least a portion of the metadata about the tangible property from the private vault, wherein the second request comprises a second credential;

validating the second credential as the private key that secures read access for the private vault;

retrieving, in response to the validating the second credential as the private key, one or more metadata elements about the tangible property from the private vault; and executing, in response to authenticating that ownership of the tangible property is being transferred or has been transferred from an owner to a new owner, one or more smart contracts that transfer the non-fungible token from a token wallet issued to the owner to a token wallet issued to the new owner, wherein the private key is transferred from the owner to the new owner based on the authenticating that ownership of the tangible property is being transferred or has been transferred.

2. The method of claim 1, wherein the non-fungible token corresponds to one or more of a vehicle, real-estate, a personal property item, or a combination thereof.

3. The method of claim 1, wherein the tangible property is a house, the non-fungible token corresponds to the house, and the metadata stored at the private vault comprise one or more of maintenance records, certifications, architecture records, title records, or any combination thereof, for the house.

4. The method of claim 1, wherein the tangible property is a motor vehicle, the non-fungible token corresponds to the motor vehicle, and the metadata stored at the private vault comprise one or more of maintenance, service, or repair records, certifications, title records, motor vehicle features, or any combination thereof for the motor vehicle.

5. The method of claim 1, wherein, the non-fungible token is minted on a blockchain in response to authenticating a) an identity of a person; b) an owner of the tangible property; or c) any combination thereof.

6. The method of claim 5, wherein, in response to the authenticating, the token wallet issued to the owner is generated, the minted non-fungible token is transferred to the token wallet issued to the owner, and a transaction is added on the blockchain that implements the non-fungible token transfer to the token wallet issued to the owner.

7. The method of claim 6, wherein, in response to the authenticating, one or more smart contracts perform one or more of the non-fungible token minting, the generation of the token wallet issued to the owner, the non-fungible token transfer to the token wallet issued to the owner, the addition of the transaction to the blockchain, or any combination thereof.

8. The method of claim 1, wherein, in response to authenticating that a title for the tangible property is transferred from the owner to the new owner, one or more smart contracts add a transaction to the blockchain that implements the non-fungible token transfer from the token wallet issued to the owner to the token wallet issued to the new owner.

9. The method of claim 8, wherein authenticating that ownership of the tangible property is being transferred or has been transferred comprises authenticating that the title for the tangible property is transferred from the owner to the new owner.

10. The method of claim 1, wherein an access token is received along with the first request that identifies a requesting entity that issues the first request.

11. The method of claim 10, further comprising:

validating, using the access token, a) a group membership of the requesting entity; and b) that the group comprises access permissions to write metadata to the private vault, wherein the permitting the first request to write the metadata about the tangible property to the private vault is performed in response to the validating that the access token permits the requesting entity to write metadata to the private vault.

12. A non-transitory computer-readable storage medium storing instructions that, when executed by a computing system, cause the computing system to perform a process for securing a metadata vault with a non-fungible token, the process comprising:

storing, at a private vault, metadata for tangible property, wherein the private vault is secured by a private key and a non-fungible token comprising a public key, and wherein the public key permits write access to the private vault and the private key permits read access to the private vault;

receiving a first request to write a metadata about the tangible property to the private vault, wherein the first request comprises a first credential;

validating the first credential as the public key from the non-fungible token;

permitting, in response to the validating the first credential as the public key, the first request to write the metadata about the tangible property to the private vault;

receiving a second request to retrieve at least a portion of the metadata about the tangible property from the private vault, wherein the second request comprises a second credential;

validating the second credential as the private key that secures read access for the private vault;

transmitting, in response to the validating the second credential as the private key, one or more metadata elements about the tangible property from the private vault; and executing, in response to authenticating that ownership of the tangible property is being transferred or has been transferred from an owner to a new owner, one or more smart contracts that transfer the non-fungible token from a token wallet issued to the owner to a token wallet issued to the new owner, wherein the private key is transferred from the owner to the new owner based on the authenticating that ownership of the tangible property is being transferred or has been transferred.

13. The non-transitory computer-readable storage medium of claim 12, wherein the non-fungible token corresponds to one or more of a vehicle, real-estate, a personal property item, or a combination thereof.

14. The non-transitory computer-readable storage medium of claim 12, wherein the tangible property is a house, the non-fungible token corresponds to the house, and the metadata stored at the private vault comprise one or more of maintenance records, certifications, architecture records, title records, or any combination thereof, for the house.

15. The non-transitory computer-readable storage medium of claim 12, wherein, the non-fungible token is minted on a blockchain in response to authenticating a) an identity of a person; b) an owner of the tangible property; or c) any combination thereof.

16. The non-transitory computer-readable storage medium of claim 12, wherein, in response to authenticating that a title for the tangible property is transferred from the user to the new owner, one or more smart contracts add a transaction to the blockchain that implements the non-fungible token transfer from the token wallet issued to the user to the token wallet issued to the new owner.

17. The non-transitory computer-readable storage medium of claim 16, wherein, authenticating that ownership of the tangible property is being transferred or has been transferred comprises authenticating that the title for the tangible personal property is transferred from the owner to the new owner.

18. The non-transitory computer-readable storage medium of claim 12, wherein an access token is received along with the first request that identifies a requesting entity that issues the first request.

19. The non-transitory computer-readable storage medium of claim 18, wherein the process further comprises:

validating, using the access token, a) a group membership of the requesting entity; and b) that the group comprises access permissions to write metadata to the private vault, wherein the permitting the first request to write the metadata about the tangible property to the private vault is performed in response to the validating that the access token permits the requesting entity to write metadata to the private vault.

20. A computing system for securing a metadata vault with a non-fungible token, the computing system comprising:

one or more processors; and one or more memories storing instructions that, when executed by the one or more processors, cause the computing system to perform a process comprising:

storing, at a private vault, metadata for tangible property, wherein the private vault is secured by a private key and a non-fungible token comprising a public key, and wherein the public key permits write access to the private vault and the private key permits read access to the private vault;

receiving a first request to write a metadata about the tangible property, to the private vault, wherein the first request comprises a first credential;

validating the first credential as the public key from the non-fungible token;

permitting, in response to the validating the first credential as the public key, the first request to write the metadata about the tangible property to the private vault;

receiving a second request to retrieve at least a portion of the metadata about the tangible property from the private vault, wherein the second request comprises a second credential;

validating the second credential as the private key that secures read access for the private vault;

transmitting, in response to the validating the second credential as the private key, one or more metadata elements about tangible property from the private vault; and executing, in response to authenticating that ownership of the tangible property is being transferred or has been transferred from an owner to a new owner, one or more smart contracts that transfer the non-fungible token from a token wallet issued to the owner to a token wallet issued to the new owner, wherein the private key is transferred from the owner to the new owner based on the authenticating that ownership of the tangible property is being transferred or has been transferred.

* * * * *